Sept. 20, 1971  R. H. BUNDUS  3,605,649
CONTROLLED EXPANSION OF PUFFED SNACKS
Filed July 22, 1969
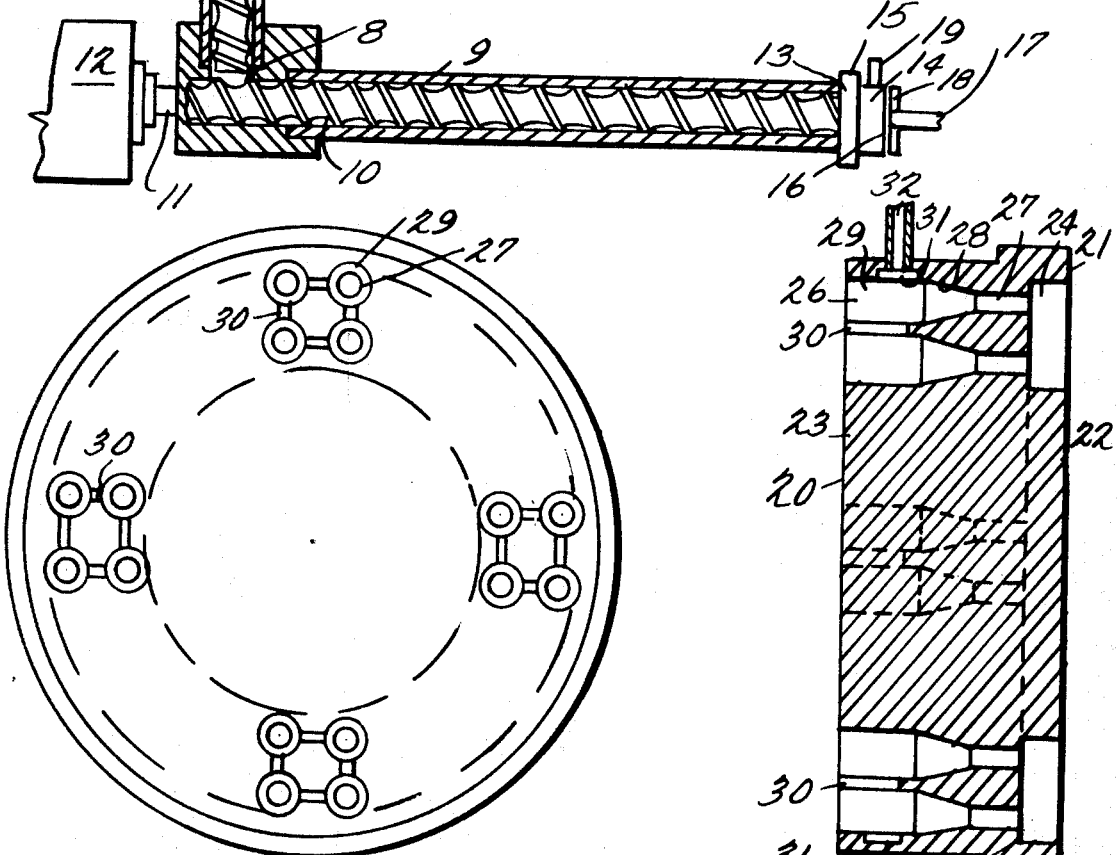
INVENTOR
ROBERT H. BUNDUS
BY Cushman Darby & Cushman
ATTORNEYS

United States Patent Office 3,605,649
Patented Sept. 20, 1971

3,605,649
CONTROLLED EXPANSION OF PUFFED SNACKS
Robert H. Bundus, Riverside, Ill., assignor to
Beatrice Foods Co., Chicago, Ill.
Filed July 22, 1969, Ser. No. 843,662
Int. Cl. A23l 1/18; B29f 3/00
U.S. Cl. 107—54                                       4 Claims

ABSTRACT OF THE DISCLOSURE

Uniformly expanded extrudant is obtained by passing the extrudant of extruder through a shaping portion, an expanding portion and a stabilizing portion of a bore in a die plate. Shaping with no expansion takes place in the shaping portion, a gradual expansion takes place in the tapered expanding portion and no expansion takes place in the stabilizing portion.

---

The present invention relates to a method and apparatus for a controlled expansion of extruded snack foods, especially snack food made from cereal meals.

More particularly, this invention relates to shaped snack food made by the explosive expansion of a vaporizing liquid, e.g., steam in a cereal, meal or like composition.

Products made by the expansion of steam and like vaporizable liquids in cereal compositions have a wide market at the present time, and among these are snacks prepared generally from corn meal or the like cereals and having various flavors such as cheese flavors. These products have been formed by subjecting a cereal meal with a vaporizable liquid, e.g. water, therein to high temperatures under high pressures and permitting the meal to escape into the air whereupon the steam generated therein expands, producing porous products. Very little control of the expansion of such products has heretofore been possible. The exploded products were completed for marketing by baking and then given suitable treatments as with salt, flavoring matters, or the like.

An improvement over the prior art has been disclosed in U.S. Pats. 2,915,957 and 3,104,975 to Bowman. These patents disclose a method and apparatus for producing food products, as noted, and wherein the expansion is controlled by extruding into a forming die. However, the products formed in the die or mold frequently have surface compaction and lack uniformity of texture.

Accordingly, it is an object of the present invention to provide a process and apparatus which is an improvement over the prior art process and apparatus wherein the expansion and texture of puffed products is controlled. Other objects will be apparent from the following disclosure and claims. At the outset, it should be understood that the particular feed and extrusion method and apparatus useful with the present invention are not critical and any desired feed and extrusion method and apparatus may be used so long as the feed is raised to a sufficient temperature and pressure so that the liquid content, e.g., water, of the feed is held essentially in the vapor state and is highly compressed. The foregoing is, of course, necessary, since when the feed is metered into the die device of the invention, the feed must explosively expand therein and fill the same. This explosive expansion gives rise to the quality and texture of the product produced, as is well known in the art. Generally speaking, the temperature and pressure under which the feed is metered into the die device should be sufficient to increase the volume of the feed from 3 times to 10 times that of the volume of the feed prior to being metered into the die device, and more preferably from 4 times to 9 times, e.g., 5 times. Accordingly, for purposes of illustration of the present invention, the feeding, metering, cooking and extruding devices and methods disclosed in the above noted Bowman patents are specifically referenced and these disclosures are incorporated herein by reference.

As will become evident, a large variety of cereals may be used in the practice of the invention, and these, depending upon their individual properties (e.g. moisture content, starch content, specific gravity) may require the use of varying conditions for the optimum operation of the method. To furnish a clear example of the invention reference will be hereafter confined in the description of the operation to the use of corn meal. The method and apparatus may be used, however, for the processing of other than cereal products only. For example, there may be used as the material treated compositions containing starch (corn, rice, albido, wheat, potato, etc.) shrimp or other sea food, meat, and other cellular edible mixtures.

Also, as will be appreciated, the process and apparatus may be used with non-edible feeds. Any material which may be molded by expansion in the same manner as cereal and like products can be processed with the present method and apparatus. Hence, cellular plastics which have a foamed final configuration may be used. It is only necessary that a vaporizable liquid be worked into the plastics in the same manner as with cereals so that an explosive expansion occurs during molding. For example, polystyrene, polyethylene, polypropylene, cellulose derivatives, etc., may be used with a liquid which will work into the same, e.g., a swelling liquid.

The invention will be understood with reference to the drawing where:

FIG. 1 is a schematic partial cross section illustrating a suitable extrusion device similar to that disclosed in the Bowman patents with the present die shown therewith;

FIG. 2 is a cross section illustrating the die of the present invention; and

FIG. 3 is a plan of the die of the present invention.

The general operation of the process is described in connection with FIG. 1. This general and simplified description of the operation of the process is set out herein in order to provide background information of the process in a manner uncluttered by details which are fully disclosed in the Bowman patent but not directly pertinent to the present invention.

The corn meal in dry condition (having, for example, an inherent moisture content 8 to 10%), or with additional water added thereto, is supplied to an extrusion device generally indicated by 1 having a hopper indicated at 2 which delivers it to a chamber 3 from which it is fed through a tube indicated at 4 by means of a screw 5 driven by a motor 6. The screw 5 serves only as a conveyor and takes no appreciable part in raising the temperature of the meal or otherwise affecting the results. In accordance with the method it is desirable to admix water with the meal and this may be accomplished by feeding water in measured quantity through a connection 7 to the meal as it leaves the chamber 3 under the action of the conveyor screw. Typically, assuming an inherent moisture content in the meal as indicated above, the water may be added at the rate of four to seven quarts per hundred pounds of the meal or in any event, water is added to accomplish expansions within the ranges noted above. This water addition may be made up by premixing water with the meal, premixing part of the water with the meal and adding the remainder at 7, or by adding the entire quantity at 7. The second procedure is preferred, the amount added at 7 being in minor amount. Any feed of water is accomplished by the use of an adjustable delivery pump for the water operated by the motor 6 which drives the screw. Three motors are used for driving the various moving parts of the apparatus. These motors may be of adjustable speed types so that their speeds may be individually regulated relative to each other, or, alternatively, fixed speed motors or a single motor may be used to drive the various shafts through adjustable speed devices of well known types.

The tube 4 through which the corn meal is fed opens into a chamber 8 from which a tube 9 extends. Extending from the chamber 8 through the bore of the tube 9 is a composite screw 10 the shaft 11 of which forms a continuation thereof, being driven by a motor 12. This screw 10 typically operates at a high speed, for example, at thirty-six hundred revolutions per minute; a typical motor which is used with a tube 14 having an internal diameter of 1¼ inches develops 40 horsepower. The power of the motor is particularly mentioned since it is indicative of the energy which in the apparatus is transformed into heat and pressure energy in the material undergoing treatment. High speed of screw rotation is particularly effective in securing best results.

At the discharge 13 of the extruder is a die plate 14 attached to the extruder by means of a clamping ring 15. Adjacent the face 16 of the die plate 14 is a chopper assembly 17 having knife blades 18. The chopper assembly is conventional and is rotatable (by means not shown) about the axis of the assembly in a conventional manner. Preferably the die plate has a flavoring and coloring inlet means 19.

FIG. 2 shows the present die plate and is generally indicated at 20. The extruder discharge 13 abuts the seal face 21 of die plate 20 in a conventional manner and the pumping vanes (not shown) of the screw 10 are close to the solid face 22 of die plate 20. Of course, the chopper assembly 17 is close to exterior face 23 of die plate 20. The die plate has an annular space 24 for receiving the extrudant of the extruder and distributing the extrudant in the die plate. The annular face 25 of the annular space 24 is suitably recessed ⅛ to ¼ inch in the die plate. A bore 26 traverse the die plate from the annular face 25 to the exterior face 23. Bore 26 has three portions of different cross-sectional area: a first bore portion 27, a second bore portion 28 and a third bore portion 29. The first portion has a cross-sectional area of less than the third portion and the second bore portion is tapered with one end of the taper having the same cross-sectional area as the first bore portion and the opposite end having a cross-sectional area the same as that of the third portion. The die plate will suitably have a plurality of bores arranged around the outer part thereof. Optionally, a grouping of bores may be in the die plate as shown in FIGS. 2 and 3, connected by runners 30 wherein the resultant extrudant is extruded as distinct solid portions connected by ribs (the die illustrated will produce four rods connected by four ribs). However, for most purposes, a grouping of bores with the associated runner is not needed and a plurality of bores, not in grouping, will be used. This latter embodiment is therefore the one most likely to be used and the embodiment with groupings will not be further discussed. Disposed in portion 26 is an annular recess 31 connected to a coating supply source. The coating is liquid oil and may include any desired coating such as salt, sugar, spices, flavoring agents, coloring agents etc.

The coloring and flavoring agents are passed into the annular recess 31 under a pressure greater than the pressure in portion 29, so that as the extrudant passes through portion 29 the coloring and flavoring agent is wiped on the surface of the extrudant. For purposes of illustration the annular recess is shown larger in cross section than is really necessary in order to make the recess of the drawing clear. However, the recess is suitably only ¹⁄₆₄ to ³⁄₁₆ inch across, especially ¹⁄₁₆ to ⅛ inch across and having a depth of ¹⁄₆₄ to ½ inch, especially ¹⁄₃₂ to ⅜ inch. Also, most suitably, the recess is near the exit of portion 29. The annular recess is preferably disposed in portion 29, but it may be disposed in any part of the bore, i.e. portions 27, 28 and 29.

In operation, the cereal meal at elevated temperature and pressure, e.g. from 30 p.s.i.g. to 750 p.s.i.g. and at temperatures from 200° F. to 550° F, e.g. 250° F. to 450° F., especially 370° F. to 385° F., passes from the extruder discharge into annular space 24 and is distributed therethrough. The meal then passes into the first portion 27 of bore 26 which is so sized that the pressure of the meal as delivered by the extruder is not substantially changed. Portion 27 merely forms the extrudant into a shape. Portion 28, the tapered portion, allows the shaped meal to gradually expand in a controlled manner and is so sized that when the meal reaches the exit of portion 28 (the juncture between portion 28 and portion 29) the meal has expanded to substantially its maximum potential expansion. As the expanded meal passes through portion 29 it is stabilized in shape and is wiped with coloring and flavoring supplied from annular recess 31. After exiting from portion 29, the cooled, flavored and colored extrudant is chopped into desired lengths by a conventional chopper assembly 17, operated in a conventional manner.

From the above, it is apparent that the cross-sectional area of portions 27, 28 and 29 of bore 26 must be so sized, with regard to the potential expansion of the heated and pressurized meal, as to control the expansion thereof. Hence, if the amount of water in the meal (in the vapor state) will give a 5 to 1 expansion, the exit end of portion 29 and portion 28 must have a cross-sectional area 5 times that of portion 27. The amount of expansion is easily determined from steam tables. Hence, at 370° F. one pound of water produces 2.3 cu. ft. of saturated steam. For an expansion of 5 times, 0.46 cu. ft. of cereal meal per pound of water is used at that temperature. Extrusion at any other temperature and expansion, as desired, may be similarly determined. Further, for any feed rate to the extruder, and hence the flow through portion 27, portion 27 must be so sized that no substantial expansion takes place therein, i.e. less than 15% of the maximum expansion. This is, of course, easily accomplished by means of the annular space 24, since the cross-sectional area of portion 27 of all of the plurality of bores 26 is always less than the cross-sectional area of annular space 24.

In connection with portion 29, some latitude is permissible and yet essentially stabilized the product being extruded and obtain a uniform shape. Hence, the cross-sectional area of portion 29 should be substantially sized to match the maximum potential expansion, i.e. may be as much as 10% greater than or 10% less than the maximum expansion of the meal passing through the bore 26. If these limits are observed the extruded product will not be substantially different in shape from that of portion 29.

Of course, bore 26 need not be circular; it may be square, irregular, star-shaped, in the shape of the suits of playing cards, etc.

The coloring and flavoring agents are not at all critical and may be any of the food grade coloring and flavoring agents, e.g. onion extract, cheese flavors, fruit flavors, vegetable flavors, Red, Blue, Green, etc. Certified colors.

As can be seen from the above, the heated and pressurized mass to be extruded is passed through an annular space for receiving the extrudant from the extruder, a shaping portion, an expanding portion and a stabilizing portion of at least one bore in the die plate. Substantially no expansion takes place in the shaping portion, essentially all expansion takes place in the expanding portion and essentially no expansion takes place in the stabilizing portion. To accomplish this, the cross-sectional area of the shaping portion is less than the cross-sectional area of the annular space, i.e. the annular space adjacent each bore which can be seen from FIGS. 1 and 2 to be large as compared with portion 27. The ratio of the cross-sectional area of the stabilizing portion to the cross-sectional area of the shaping portion should be substantially the same, i.e. ±10%, as the ratio of the volume of the unexpanded meal and water therewith to the maximum potential volume (as calculated as above) of the expanded meal.

A die was made having a diameter of 4 3/16 inches across the clamping ring, a diameter of 3 31/32 inches across the face of the die and 26 bores on a 1 3/4 inches radius. The annular space was 1/4 inch deep, and 17/32 inch from the outer to the inner wall thereof. The first portion of the bore was 9/64 inch in diameter and 5/16 inch long; the third portion of the bore was 5/16 inch in diameter and 1/2 inch long; the second portion was 3/8 inch long. Corn meal having water therein and a maximum potential expansion of 5 to 1 was extruded through the die, with the die at 380° F. The extrudant was chopped to 1 inch long rods. The rods were uniformly shaped and even in configuration.

What is claimed is:

1. In a process for extruding an expanded product by subjecting an expandable cereal mass having a vaporizable liquid to elevated temperatures and pressures and passing the heated and pressurized expandable mass through a die whereby shaping of the expandable mass is accomplished, the improvement comprising passing the expandable mass, heated to temperatures between 200° and 550° F. and pressurized to between 30 to 750 p.s.i.g., into an annular space adjacent the discharge of the extruder, passing the mass from the annular space through a first portion of a bore wherein the said first portion of the bore is so sized that the mass is shaped but not substantially reduced in pressure or expanded, passing the shaped mass through a second portion of the said bore wherein the mass is gradually expanded to substantially the maximum potential expansion thereof and passing the expanded and shaped mass through a third portion of the bore wherein the expanded and shaped mass is stabilized wherein the cross-sectional area of the said first portion of the bore is less than the cross-sectional area of the said annular space adjacent thereto, the ratio of the cross-sectional area of the said third portion of the bore to the cross-sectional area of the said first portion of the bore being substantially the same as the ratio of the volume of the unexpanded mass to the maximum potential volume of the expanded mass, and the said second portion of the bore connecting in a tapered manner the said first and third portions.

2. The process of claim 1 wherein a flavoring agent is wiped on the surface of the expanded mass as it passes through the said third portion of the bore.

3. The process of claim 2 wherein a coloring agent is wiped on the surface of the expanded mass as it passes through the said third portion of the bore.

4. The process of claim 1 wherein the cross section of the extruded mass is irregular in configuration.

References Cited
UNITED STATES PATENTS

| | | | |
|---|---|---|---|
| 2,858,219 | 11/1958 | Benson | 107—54R |
| 3,231,387 | 1/1966 | Tsuchiya | 99—238R |
| 3,265,786 | 8/1966 | Voelker | 18—12F |
| 3,291,032 | 12/1966 | Graves | 99—238 |
| 3,222,722 | 12/1965 | Reifenhauser | 18—12F |
| 3,316,335 | 4/1967 | Snella | 18—12F |
| 3,413,388 | 11/1968 | Lux | 264—46 |

JOHN E. MURTAGH, Primary Examiner

U.S. Cl. X.R.

18—12; 99—238; 107—14; 264—53, 177